United States Patent [19]

McCrery et al.

[11] Patent Number: 5,046,007

[45] Date of Patent: Sep. 3, 1991

[54] MOTOR VEHICLE DATA COLLECTION DEVICE

[75] Inventors: Shawn F. McCrery, College Place; Thomas A. Seim, Richland, both of Wash.

[73] Assignee: Accutek Industries, Inc., Walla Walla, Wash.

[21] Appl. No.: 362,744

[22] Filed: Jun. 7, 1989

[51] Int. Cl.⁵ .......................... G06F 7/70; G01D 9/00; B60Q 1/00; B60L 1/00

[52] U.S. Cl. .......................... 364/424.04; 364/424.03; 364/550; 346/33 R; 340/425.5; 307/10.1

[58] Field of Search ...................... 364/424.01, 424.03, 364/424.04, 550, 561; 346/33 D, 33 R; 340/425.5, 428; 307/9.1, 10.1

[56] References Cited

U.S. PATENT DOCUMENTS

| | | |
|---|---|---|
| 4,167,040 | 9/1979 | Heritier et al. . |
| 4,205,376 | 5/1980 | Yoshida .......................... 364/424.01 |
| 4,258,421 | 3/1981 | Juhasz et al. . |
| 4,338,512 | 7/1982 | Ludwig . |
| 4,344,136 | 8/1982 | Panik .............................. 364/424.04 |
| 4,490,798 | 12/1984 | Franks et al. . |
| 4,539,641 | 9/1985 | Kawashimo et al. . |
| 4,547,781 | 10/1985 | Gelhorn et al. . |
| 4,561,057 | 12/1985 | Haley, Jr. et al. . |
| 4,564,905 | 1/1986 | Masuda et al. . |
| 4,677,429 | 6/1987 | Glotzbach ...................... 364/424.04 |
| 4,685,061 | 8/1987 | Whitaker . |
| 4,757,454 | 7/1988 | Hisatake et al. ............ 364/424.03 X |
| 4,843,578 | 6/1989 | Wade ............................... 364/424.01 |
| 4,862,364 | 8/1989 | Matsuda .......................... 364/424.01 |
| 4,875,167 | 10/1989 | Price et al. ...................... 364/424.04 |
| 4,926,331 | 5/1990 | Windle et al. ................... 364/424.04 |
| 4,939,652 | 7/1990 | Steiner ............................. 364/424.04 |

OTHER PUBLICATIONS

"The End of the Mileage Log Book," (Advertisement for the Odometer Data Computer from Mileage Validator).
Price Sheet from Mileage Validator (two pages).
Sales Brochure for Milog.

*Primary Examiner*—Parshotam S. Lall
*Assistant Examiner*—Ed Pipala
*Attorney, Agent, or Firm*—Finnegan, Henderson, Farabow, Garrett & Dunner

[57] ABSTRACT

The invention includes a device for collecting travel-related data for a motor vehicle. The usage data includes such data as a start time and date of a trip, a beginning odometer reading, a category code indicating the purpose of the trip, a sub-category code further indicating the purpose of a trip, and maintenance information for the vehicle. Data collection begins when the ignition system of the vehicle is activated. The invention includes means for downloading the collected data to an external device, such as a microcomputer.

21 Claims, 13 Drawing Sheets

| MAINTENANCE CODE KEY | FUNCTION |
| --- | --- |
| "TIME" | SET TIME |
| "DATE" | SET DATE |
| "ODOM" | SET ODOMETER |
| "TIRES" | LOG DATE OF TIRE CHANGE |
| "FUEL" | LOG DATE OF REFUEL |
| "OIL" | LOG DATE OF OIL CHANGE |
| "LUBE" | LOG DATE OF LUBE JOB |
| "TUNE" | LOB DATE OF TUNEUP |
| "CHKUP" | LOG DATE OF CHECKUP |

FIG. 13

MOTOR VEHICLE DATA COLLECTION DEVICE

BACKGROUND OF THE INVENTION

The present invention relates generally to data recording devices, and more particularly, to a device to collect usage data for a motor vehicle and to interface with a microcomputer.

Persons using a company vehicle for personal, business, or other travel-related purposes are faced with the challenge of maintaining accurate, timely mileage and usage records for tax deduction reporting and for internal record keeping. Persons responsible for keeping records for fleets of business vehicles must keep track of vehicle usage by company employees, and must maintain organized, detailed records of individual vehicle data and statistics for entire vehicle fleets.

Keeping truly contemporaneous records by hand is a tedious task. The operator of the vehicle must keep a pen and journal or clipboard-type log on hand in the vehicle at all times, and then must remember to make the necessary entry for each trip's mileage, date, time, and purpose. Furthermore, at reporting time, all entries for a given period must be tabulated by hand to produce a final cumulative record for that period.

U.S. Pat. No. 4,685,061 to Whitaker discloses one version of an automatic data recording device. It allows entry of a alphanumeric code to identify the purpose of a trip and keeps track of the time and distance travelled for each trip. Whitaker, however, uses vehicle motion as a sole criterion for when to begin and end recording data for a trip. This criterion can be disadvantageous if a motor vehicle must make several stops during the course of a single trip. For example, a delivery vehicle may leave a central distribution point and proceed to various customer locations where the driver leaves the vehicle running while he makes deliveries. In addition to stops made during deliveries the driver will make stops due to stop lights and traffic jams. In such a case each new start of motion is recorded as the beginning of a new trip and an operator must reenter the code specifying the trip purpose. Such repeated reentry of codes is inefficient and annoying and results in trip information being saved that does not accurately reflect vehicle usage, since one long trip containing several stops will actually be recorded as several short trips.

Whitaker attempts to solve the above problem by specifying a time duration that must elapse before interruptions in vehicle motion are interpreted as the end of a trip. Use of such a specified time duration is a stop-gap measure at best, however, because no matter what time duration is specified, stops will always occur that are longer than the specified duration, again causing the inefficient and inaccurate data recording described above.

The present invention overcomes the problems and disadvantages of the prior art by using the activating and deactivating of a vehicle engine as the primary criteria for determining the beginning and end of a trip and by including a computer-compatible means to download data to an external device, such as a microcomputer.

An object of the invention is to provide a device to collect vehicle usage data for a vehicle trip beginning when the vehicle ignition is activated and ending when the vehicle ignition is deactivated.

Another object of the invention is to provide a device to collect vehicle maintenance data for a vehicle.

Another object of the invention is to provide a device to collect other travel-related data such as data on meals and lodging expenses.

A further object of the invention is to provide a device to collect vehicle usage data that can be connected directly to an external device and that can download the collected data to the external device.

Additional objects and advantages of the invention will be set forth in part in the description which follows, and in part will be obvious from the description, or maybe learned by practice of the invention. The objects and advantages of the invention will be realized and obtained by means of the elements and combinations particularly pointed out in the appended claims.

SUMMARY OF THE INVENTION

To achieve the objects and in accordance with the purpose of the invention, as embodied and broadly described herein, there is provided a device for collecting usage data for a motor vehicle having an ignition system activated for starting and deactivated for stopping the engine of the vehicle. The device of the present invention comprises: means for generating a distance travelled pulse for each incremental distance of travel, means for generating a clock signal, and ignition detection means responsive to the activation of the ignition system for generating a vehicle on signal and responsive to the deactivation of the ignition system for generating a vehicle off signal. A memory means stores trip record data including a trip start time and an initial odometer reading. The memory means also stores a current odometer reading. The device further comprises a processor means connected to the memory means. The processor means includes means for generating a trip start time from the clock signal when the vehicle on signal is received and means for determining an initial odometer reading from the current odometer reading upon receipt of the vehicle on signal. The processor means also includes means for updating the current odometer reading, in accordance with a number of distance travelled signal pulses received after receipt of the vehicle on signal. The processor means also includes means for storing in the memory means trip record data including the initial odometer reading and the trip start time. The device also comprises means for directly connecting the device to an external device and means for downloading the stored trip records to the external device.

BRIEF DESCRIPTION OF THE DRAWINGS

The accompanying drawings, which are incorporated in and constitute a part of the specification, illustrate one embodiment of the invention and, together with the description, serve to explain the principles of the invention.

FIG. 13 is a table of codes used by the process of FIG. 12;

DESCRIPTION OF THE PREFERRED EMBODIMENT

Reference will now be made in detail to a present preferred embodiment of the invention, an example of which is illustrated in the accompanying drawings. Wherever possible, the same reference numbers will be used throughout the drawings to refer to the same or like parts.

Figure 1:
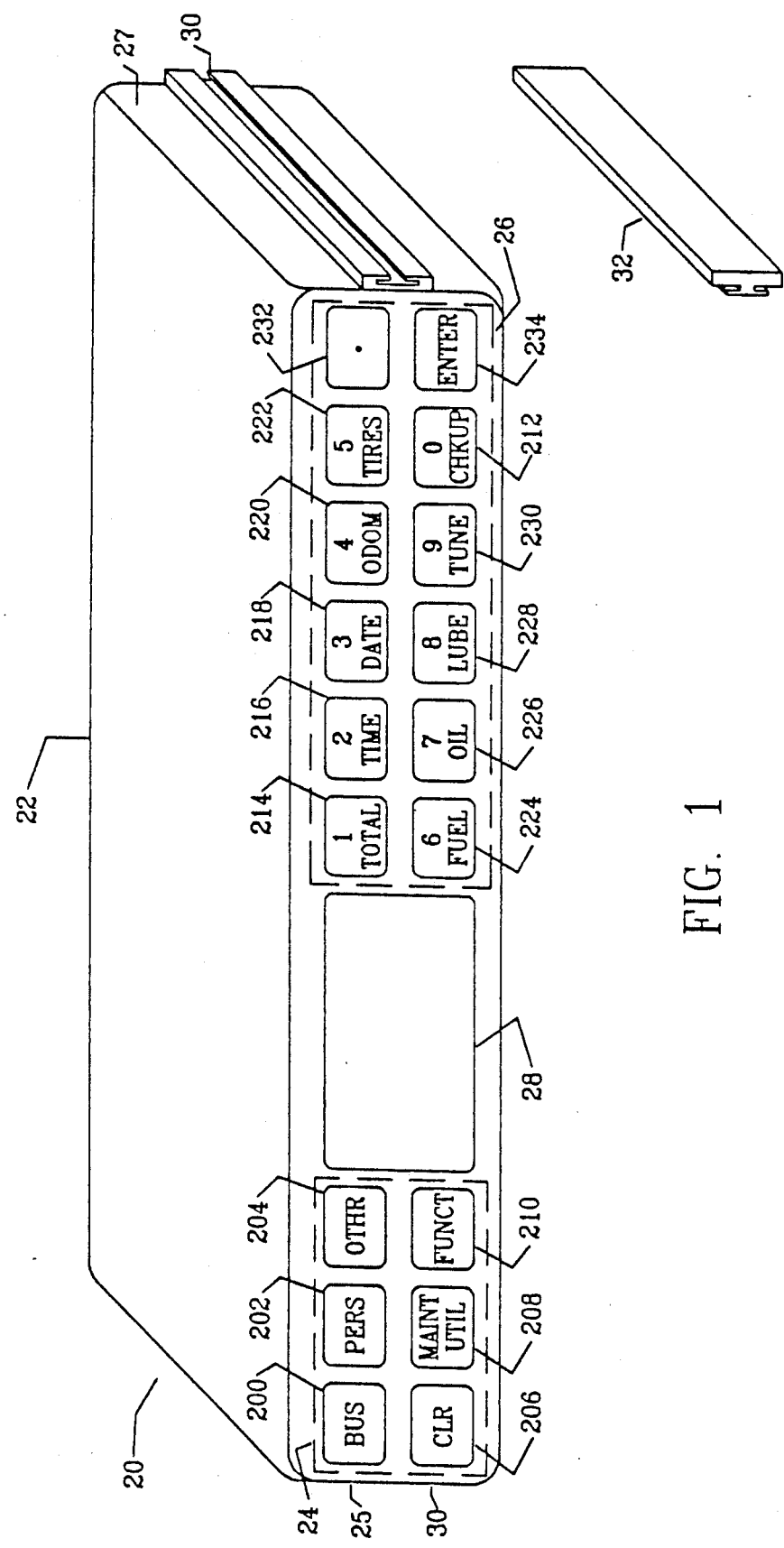
FIG. 1 is a perspective view of a motor vehicle data collection device incorporating the teachings of the present invention.

FIG. 1 is a perspective view of a motor vehicle data collection device 20 of the present invention. Motor vehicle data collection device 20 comprises a housing 22, a first multi-key keypad 24, a second multi-key keypad 26, a liquid crystal display (LCD) 28, two mounting brackets 30, and corresponding mounting brackets 32 (only one bracket 32 is shown. First multi-key keypad 24, second multi-key keypad 26, and a liquid crystal display (LCD) 28 are contained within housing 22. Mounting brackets 30 are attached to opposite ends 25 and 27 of housing 22. Mounting brackets 30 may be used to slidably secure device 20 on, in, or under a dashboard of a vehicle to which corresponding mounting brackets 32 are attached. Alternately, device 20 could also be attached to the dashboard of a motor vehicle with velcro tape, rubber cement, glue, a type of mounting bracket different from mounting brackets 30 and 32, or similar means.

A serial port for interfacing device 20 to an external device and a connector for allowing device 20 to access the electrical and ignition systems and the driveshaft of a vehicle are not shown in FIG. 1.

Figure 2:
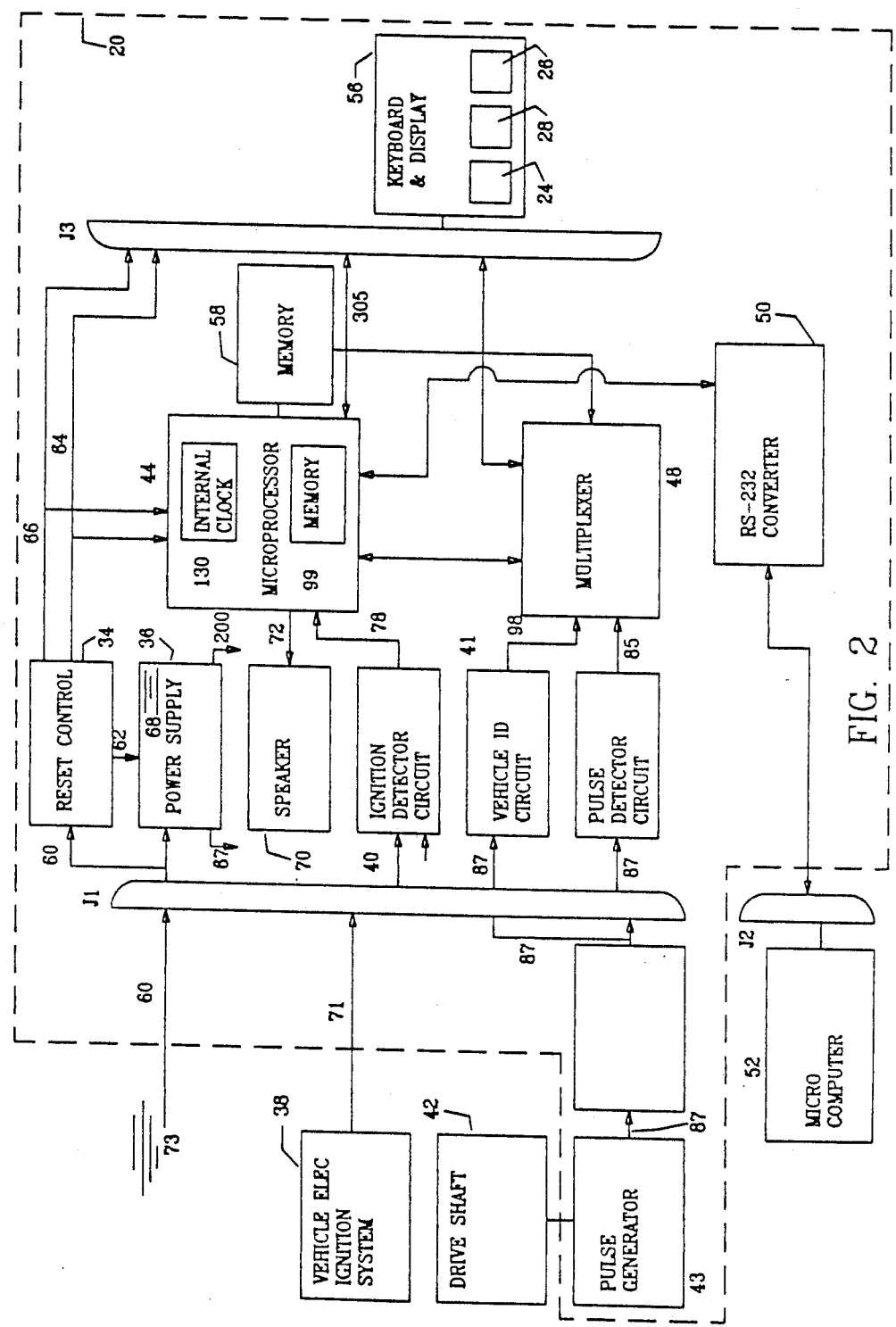
FIG. 2 is a block diagram of the major components of the motor vehicle data collection device of FIG. 1.

FIG. 2 is a block diagram of motor vehicle data collection device 20 and comprises a reset control 34, a power supply 36, a speaker 70, a vehicle ID circuit 41, an ignition detector circuit 40, a pulse generator 43, ID resistors 39 attached to a cable 87, a pulse detector circuit 46, a microprocessor 44, a multiplexor 48, an RS-232 converter 50, a keyboard and display 56, a memory 58, serial cable 300 and connectors J1, J2, and J3.

Reset control circuit 34 receives input from a vehicle battery 73. Reset control circuit 34 is connected to power supply 36, microprocessor 44, and keyboard and display 56. Power supply 36 receives input from vehicle 73 battery by way of line 60 and connector J1, and supplies power to other elements of the device as described below. Speaker 70 receives input from microprocessor 44. Vehicle ID circuit 41 receives vehicle identification signals from resistors 39 mounted in the cable 87 attached to connector J1 and passes the vehicle identification signals to microprocessor 44 on line 98 by way of multiplexor 48. Ignition detector circuit 40 sends a signal to microprocessor 44 on line 78, when a voltage drop or rise is detected in vehicle electrical ignition system 38 via line 71. Pulse generator 43 is attached to a driveshaft 42 of the vehicle. Pulse detector circuit 46 receives motion signals from pulse generator 43 by way of cable 87 and connector J1, and passes the received motion signals, by way of multiplexor 48, to microprocessor 44. RS-232 converter 50 passes control and data signals between an external microcomputer 52 and microprocessor 44. Keyboard and display 56 includes LCD 28 and keypads 24 and 26. Keyboard and display 56 is also connected directly to microprocessor 44 by way of connector J3, and to multiplexor 48, by way of connector J3. Memory 58 is connected both directly to microprocessor 44 and indirectly to microprocessor 44 by way of multiplexor 48.

In a preferred embodiment of device 20, reset control circuit 34 of FIG. 2 draws power from a line 60 connected to the vehicle's battery. Three output lines 62, 64, and 66 output signals to various components of device 20. A signal output on line 66 resets microprocessor 44 and LCD 28 when the vehicle battery discharges below a certain point or when device 20 is removed from the vehicle. A signal output on line 64 provides a backup +5 V power supply to microprocessor 44 and to keyboard and display 56. A signal output on line 62 to power supply 36 initiates a back-up power supply when the vehicle battery discharges below a predetermined point or when device 20 is removed from the vehicle.

Figure 3:
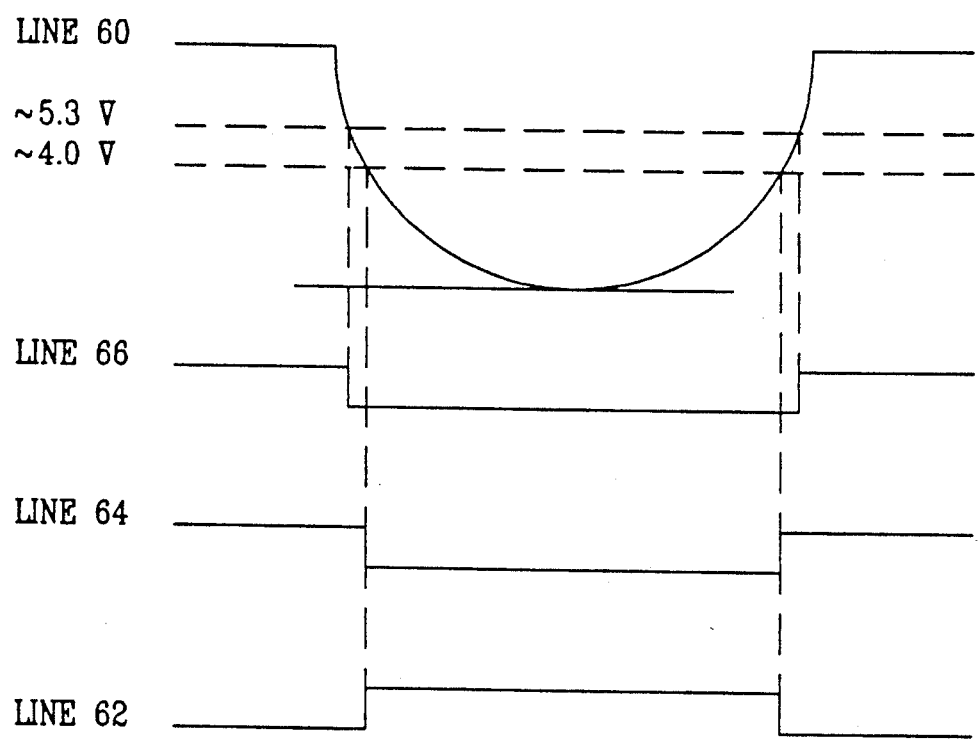
FIG. 3 is a diagram showing the relationship of signals of a reset control circuit of FIG. 2.

FIG. 3 is a diagram showing the relationship of input and output signals of reset control circuit 34 in a preferred embodiment of the present invention. As the vehicle battery discharges or when device 20 is removed from the vehicle, the signal on line 60 drops below approximately 5.3 volts and the signal on line 66 goes low. As the signal on line 60 drops below approximately 4.0 volts, the signal on line 64 also goes low and the signal on line 62 goes high. The signal on line 64 goes high when the signal on line 60 rises above approximately 4.0 volts and the signal on line 66 goes high when the signal on line 60 rises above approximately 5.3 volts. Thus, for example, line 62 goes high and the line 64 and line 66 go low when device 20 is removed from a vehicle and line 60 is no longer connected to the vehicle battery.

Power supply 36 of FIG. 2 comprises input line 60, input line 62, an output line +12 V 200, and an output line +5 V 67. Power supply 36 keeps the motor vehicle data collection device 20 powered at all times, drawing power either from the vehicle's battery 73 on line 60 or from internal forty-eight hour battery 68 when line 62 indicates that the vehicle's battery is undependable.

FIG. 2 also shows a speaker 70 controlled by a line 72 from microprocessor 44. Speaker 70 is controlled by a microprocessor 44 to emit a beeping sound to alert the user in response to a number of conditions of device 20 as described below.

In accordance with the present invention, motor vehicle data collection device 20 includes means for generating a distance travelled pulse for each incremental distance of travel. As embodied herein, the means comprises pulse generator 43 and pulse detector 46.

Figure 4:
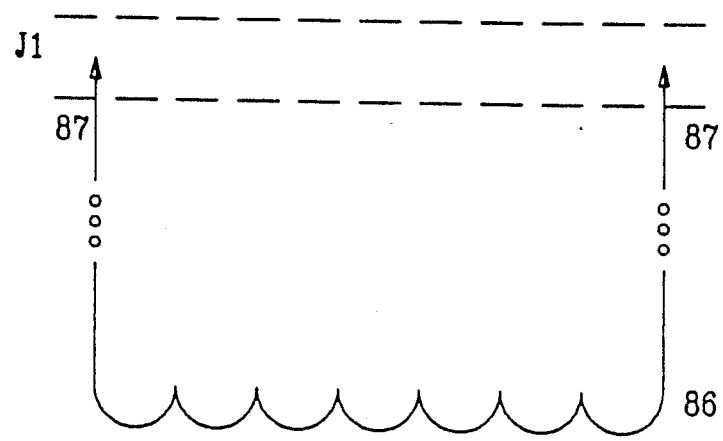
FIG. 4 is a perspective view and an end view of a pulse generator of FIG. 2.
Figure 4:
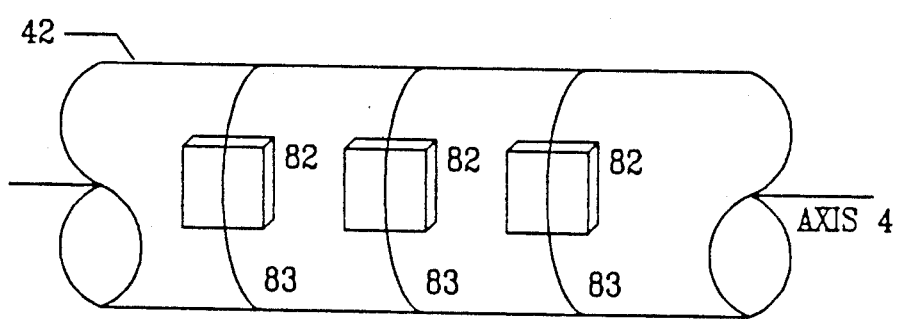

As shown in FIG. 4, pulse generator 43 comprises a plurality of magnets 82, stainless steel wire 83, a coil 86, and cable 87. Plurality of magnets 82 are preferably encased in a brass housing (not shown) and attached to driveshaft 42 of the vehicle with stainless steel wire 83. As driveshaft 42 rotates around an axis 4, magnets 82 pass near coil 86, inducing a voltage in coil 86 and cable 87.

Pulse detector circuit 46 of FIG. 2 receives the pulses output by pulse generator 43 on cable 87 and converts them to digital signals. Pulse detector circuit 46 then outputs a pulsed signal on line 85, where a predetermined number of pulses corresponds to one rotation of driveshaft 42, as determined by the number of magnets 82 mounted on driveshaft 42.

In accordance with the present invention, device 20 comprises ignition detection means, which, in a preferred embodiment, is embodied in ignition detector circuit 40. Line 71 is connected to vehicle electrical/ignition system 38. When the vehicle ignition is activated, a voltage drop is detected on line 71 and output line 78 is activated to send a "vehicle on" signal. Similarly, when deactivation of the vehicle ignition is detected on line 71, line 78 is activated to send a vehicle off signal.

Figure 5:
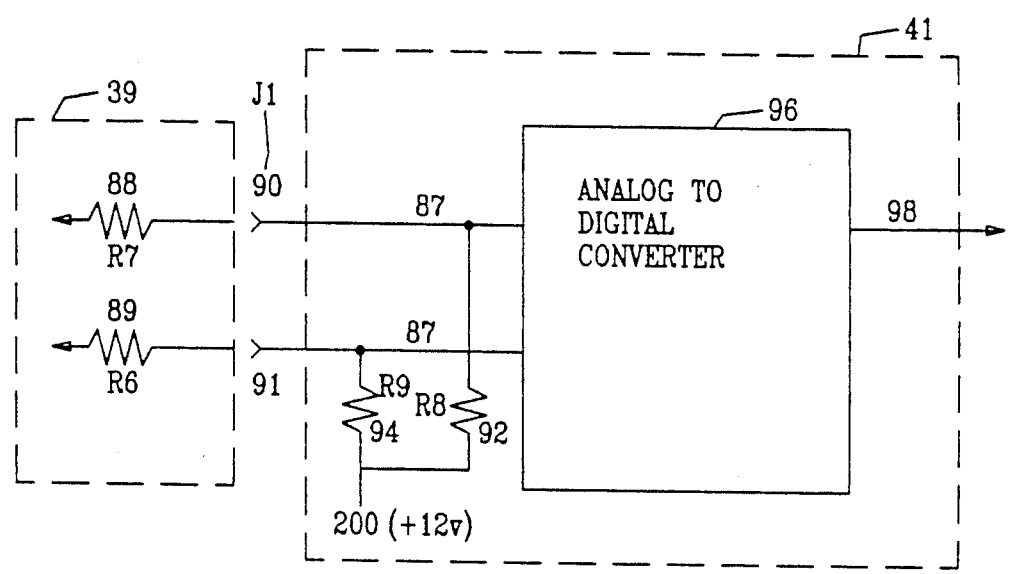
FIG. 5 is a circuit diagram of a vehicle ID/ignition detection circuit and ID resistors of FIG. 2.

In accordance with the present invention, device 20 comprises identification means for generating a vehicle identification signal. This means is embodied in vehicle ID circuit 41 and ID resistors 39. FIG. 5 shows resistors 39 and a portion of vehicle ID circuit 41. Vehicle ID circuit 41 comprises input pins 90 and 91 of connector J1 from cable 87, resistors 92 and 94, analog-to-digital converter 96, input line +12 V 200, and an output line 98. ID resistors 39 comprise resistor 88 and resistor 89.

Pins 90 and 91 of cable 87, which are input to analog-to-digital converter 96, receive signals from resistors 88 and 89, respectively. Resistors 88 and 89 are located in cable 87 connecting coil 86 with the connector J1. In a preferred embodiment, resistors 88 and 89 have respective resistance values R7 and R6 that are unique for each cable 87. Resistors 92 and 94 have resistances R8 and R9, respectively, that are identical for all units. Thus, it is possible to determine if an individual device 20 is installed in the wrong vehicle. When the vehicle ignition is turned on, +12 V line 200 is activated and analog-to-digital converter 96 receives an input voltage $V_1$ on a line connected to pin 90 of:

$$V_1 = \frac{VREF * R7}{R7 + R8}$$

where VREF is +12 V from line 200. Similarly, analog-to digital converter 96 receives an input voltage $V_2$ on a line connected to pin 91 of:

$$V_2 = \frac{VREF * R6}{R6 + R9}$$

Voltages $V_1$ and $V_2$ are output to microprocessor 44 via multiplexor 48 on serial line 98. Upon receiving voltages $V_1$ and $V_2$, microprocessor 44 compares them with predetermined values corresponding to the resistances of resistors 88 and 89 for the individual device 20. If voltages $V_1$ and $V_2$ do not match the predetermined values, microprocessor 44 alerts the user that device 20 is installed in an incorrect vehicle. In a preferred embodiment, this is done by activating speaker 70 by microprocessor 44 to produce a beeping sound.

In accordance with the present invention, device 20 comprises a memory means including memory 58 and onboard Random Access Memory (RAM) 99 of microprocessor 44, as shown in FIG. 2.

Figure 6:
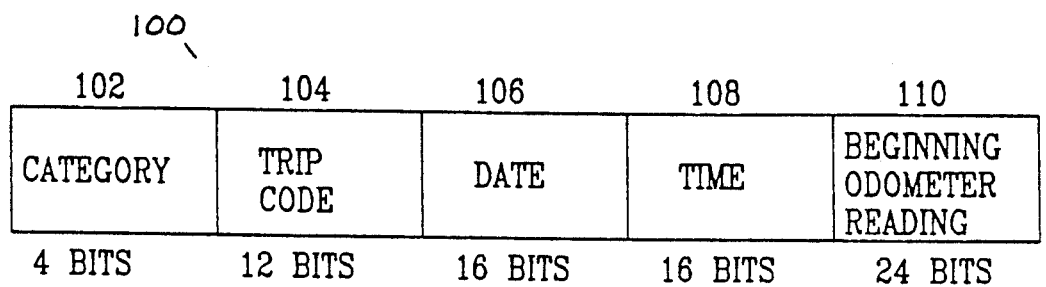
FIG. 6 is a diagram showing a format of a trip record stored in a first memory of FIG. 2.

FIG. 6 shows the format of a trip record 100 stored, in a preferred embodiment, in memory 58 of FIG. 6 (not shown to scale). Trip record 100 preferably contains a total of 72 bits, including a 4 bit category field 102, a 12 bit trip code field 104, a 16 bit date field 106, a 16 bit time field 108, and a 24 bit beginning odometer reading field 110. For each of the fields 102-110, each character of data is stored in 4 bits. Thus, category field 102 contains 1 character, trip code field 104 contains 3 characters, date field 106 contains 4 characters, time field 108 contains 4 characters, and beginning odometer reading field 110 contains 6 characters. Memory 58 preferably contains a plurality of trip records 100, of the format shown in FIG. 6.

Figure 7:
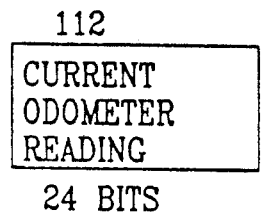
FIG. 7 is a diagram showing a format of a current odometer reading field stored in a second memory of FIG. 2.

FIG. 7 shows the format of a 24 bit current odometer reading field 112 stored, in a preferred embodiment, in onboard RAM 99 of microprocessor 44. As described above, one character of data is contained in 4 bits. Thus, current odometer reading field 112 contains 6 characters.

Figure 8:
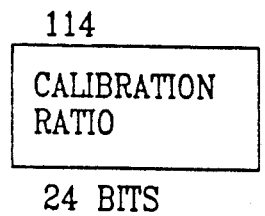
FIG. 8 is a diagram showing a format of a calibration ratio field stored in the second memory of FIG. 2.

FIG. 8 shows the format of a 16 bit calibration ratio field 114 stored, in a preferred embodiment, in onboard RAM 99 of microprocessor 44. As described above, one character of data is contained in 4 bits. Thus, calibration ratio field 114 contains 4 characters.

In accordance with the invention, motor vehicle data collection device 20 includes means for directly connecting the device to an external device and means for downloading trip records stored in the memory 58 to the external device. In accordance with the invention, motor vehicle data collection device 20 also includes means for downloading maintenance records (discussed below) stored in the memory 58 to the external device. As embodied herein, the means for downloading trip records and maintenance records comprises RS-232 converter 50 and serial cable 300, which allows the motor vehicle data collection device 20 to be plugged directly into a serial port of microcomputer 52.

The ability to remove device 20 from a vehicle and transport it to a location of microcomputer 52 eliminates the intermediate data collection devices of many existing systems that are permanently fixed in a vehicle. Allowing device 20 to plug directly into microcomputer 52 makes device 20 simpler to use and easier to manufacture. Although, in a preferred embodiment, device 20 interfaces with external microcomputer 52, any RS-232 compatible external device, such as a mainframe computer or a storage device, could be connected to RS-232 converter 50. The specification for RS-232 converters is well known in the art, and is found in Electronics Industry Association specification RS-232C, which is herein expressly incorporated by reference. Alternately, any serial or parallel interface could connect device 20 to an external device.

As embodied herein, the means for downloading trip records and maintenance records further comprises a software program stored in memory 58 and performed by microprocessor 44 for downloading the trip records and maintenance records stored in the memory 58. The downloading algorithm preferably is initiated by a download command to microprocessor 44 from external microcomputer 52 by way of the RS-232 converter 50. The details of such an algorithm are well-known to a person skilled in the electrical arts and are not described herein.

External microcomputer 52 executes a program to manipulate the data in the downloaded trip records and maintenance records to create reports. The reports are preferably printed on full-size 8.5×11 paper, and contain a detailed and easily readable summary of vehicle usage for at least the period covered by the trip summaries. Methods for generating reports containing totals, sub-totals, tabular data and the like are well-known in the data processing art and are not detailed here. The generated reports may include only the data of the downloaded trip records, or data for several months, since downloaded trip records from previous months can be saved on floppy disk or similar media. The generated reports can also contain data for only one vehicle or for several vehicles, since data downloaded from several vehicles can be stored on floppy disk or similar media for later use. Because microcomputer 52 is preferably located in an orderly and centrally-located office environment and not in the vehicle where the data collection device is installed, the generated reports are less likely to be misplaced and are more easily organized.

In a preferred embodiment of the present invention, a user can enter data into microcomputer 52 to redefine the meanings of the data in the trip records and maintenance records. For example, a user may wish to record meal information for income tax purposes. In this case, the user would either change the label of, for example, the "FUEL" key 204 to read "MEALS" or would simply remember that the "FUEL" key represented meal data. The user would then enter a meal cost instead of an amount of fuel and the maintenance record would be stored in memory with a format that is the same as the formats of the other maintenance records. The record storing meal cost has an identifying code that would normally be used for fuel data. In such an embodiment of the present invention, microprocessor 44 would allow entry of data having two decimal places, to allow monetary values to be entered. Similar redefinitions could be made for lodging expenses or other travel-related data. When the records are downloaded into microcomputer 52, microcomputer 52 interprets the records according to the redefined meanings of the codes entered previously by the user. Thus, the present invention can be used to store data other than data connected with vehicle maintenance and mileage.

FIG. 2 shows keyboard and display 56 of the present invention including first multi-key keypad 24, second multi-key keypad 26, and liquid crystal display 28. As shown in FIG. 1, first keypad 24 includes six keys marked "BUS" 200, "PERS" 202, "OTHR" 204, "CLEAR" 206, "MAINT/UTIL" 208, and "FUNCT" 210. The keys 200-210 are connected to microprocessor 44 by connector J3 and multi-bit line 305. Second keypad 26 includes ten keys 212-230 marked with the numerals "0"-"9", respectively.

Key 212 is also marked with the word "CHKUP," which is an abbreviation of "CHECKUP". Key 214 is also marked with the word "TOTAL." Key 216 is also marked with the word "TIME." Key 218 is also marked with the word "DATE." Key 220 is also marked with the word "ODOM," which is an abbreviation of "ODOMETER." Key 222 is also marked with the word "FUEL." Key 226 is also marked with the word "OIL." Key 228 is also marked with the word "LUBE." Key 230 is also marked with the word "TUNE." Second keypad 26 also includes a "." (decimal point) key 232 and an "ENTER" key 234 The keys 212-234 are connected to microprocessor 44 by connector J3 and multi-bit line 305.

Keyboard and display 56 further includes an electroluminescent panel (not shown), which serves to backlight keypads 24 and 26 and liquid crystal display 28. Liquid crystal display 28 is connected to microprocessor 44 by connector J3 and line 305. Keys pressed on keyboards 24 and 26 are displayed on liquid crystal display 28 by microprocessor 44.

In a preferred embodiment, keyboard and display 56 (also called a control panel) are positioned on a vertical front face of device 20 as shown in FIG. 1. Such a vertical placement is preferable because it allows device 20 to fit snuggly under the dashboard of the vehicle. Such a vertical control panel is safer and more ergonomic than the traditional horizontal control panel. In addition, it is easily readable and positioned similarly to other vehicle controls such as fuel gauges and indicator lights.

The function of keys 200-204 is explained in connection with FIG. 13. "CLEAR" key 206 signals microprocessor 44 to abort a function in process. "MAINT/UTIL" key 208 signals microprocessor 44 to enter a maintenance log mode described in connection with FIG. 16. "FUNCT" key 210 signals microprocessor 44 to expect a new function code to be entered.

In accordance with the invention, device 20 includes a processor means connected to the memory means and including a means for generating a trip start time from a clock signal upon receiving a vehicle on signal, means for determining an initial odometer reading from the current odometer reading upon receiving the vehicle on signal, means for updating the current odometer reading, in accordance with a number of the distance travelled pulses received after receipt of the vehicle on signal and means for storing in the memory means, the trip record including the initial odometer reading and the trip start time.

As embodied herein, the processor means comprises microprocessor 44. In a preferred embodiment, each of the means included in the processor means is embodied in a software program stored in memory 58 and performed by microprocessor 44, as described below in connection with FIGS. 9-13.

In accordance with the present invention, device 20 comprises means for generating a clock signal. The means for generating a clock signal is herein embodied in internal clock 130 in microprocessor 44. Microprocessor 44 is preferably an OKI Semiconductor 80C39 microprocessor with an onboard clock and internal RAM. The value on internal clock 130 is available to microprocessor 44 at all times. In an alternate embodiment, the means for generating a clock signal could be embodied in a clock circuit outside of microprocessor 44.

Figure 9:
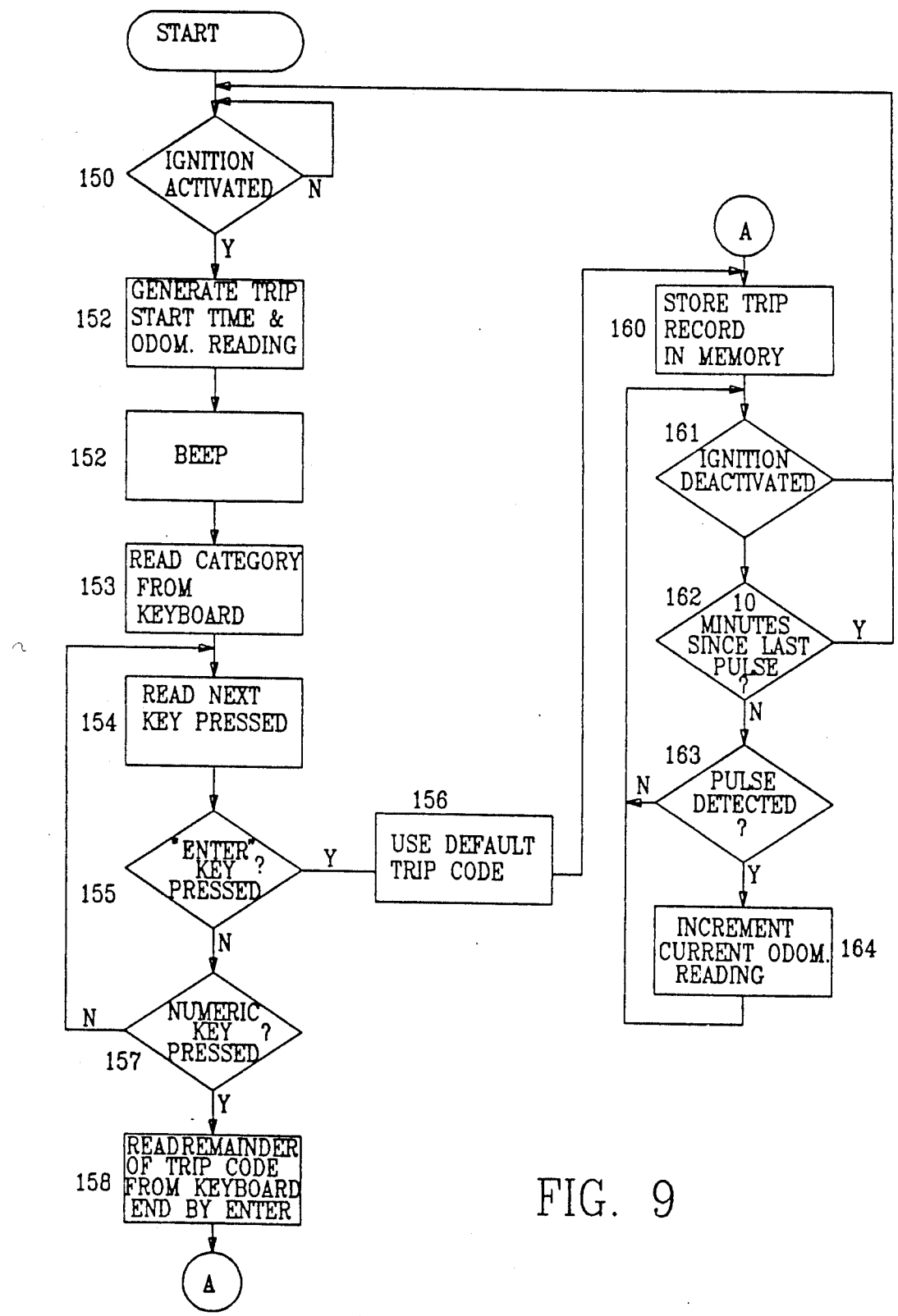
FIG. 9 is a flowchart of a process performed by a microprocessor of FIG. 2 to store a trip record.

FIG. 9 is a flowchart of an algorithm executed by microprocessor 44 under control of a software program stored in memory 58. Step 150 repeats until a signal received from ignition detector circuit 40 indicates that a voltage drop has occurred in the vehicle's electrical system. Microprocessor 44 then determines if the drop is large enough to signify activation of the vehicle ignition. Such a determination is necessary because other occurrences, such as switching on a vehicle's headlights or activation of the alternator may cause a voltage drop in the vehicle's electrical system. In a preferred embodiment of the present invention, microprocessor 44 also bases its determination of whether a voltage drop signifies vehicle ignition on whether the vehicle is currently moving. Thus, if the vehicle is moving and a voltage drop occurs, the voltage drop will be ignored. A voltage drop during vehicle motion may be due to the vehicle headlights being switched on, for example.

When the vehicle ignition is activated in step 150, microprocessor 44 reads internal clock 130 to obtain a trip start time and the current odometer reading field 112 of onboard RAM 99 to obtain a beginning odometer reading (step 151). In a preferred embodiment, the start time includes a date and a time. Microprocessor 44 then causes speaker 70 to emit a beeping sound in step 152 alerting a user to enter a category value (i.e., business, personal, or other) on first multi-key keypad 24. Microprocessor 44 reads the category from keypad 24 in step 153. Next, microprocessor 44 reads a next key press from keypad 24 in step 154. If a numeric key is pressed (step 157) then the user has elected to enter a numeric trip code on second multi-key keypad 26. The remainder of the trip code, which is terminated by "ENTER" key 234, is read by microprocessor 44 in step 158. Next, the microprocessor 44 stores trip record 100 containing the category, the trip code (if entered), the trip start time, and the beginning odometer reading in memory 58 (step 160.) If no trip code is entered, a null value, (such as "0") is entered in the trip code field 104 (step 156.) Step 161 determines whether the vehicle ignition has been deactivated. Such a determination is based on detection of a voltage rise in the vehicle's electrical system via ignition detector circuit 40. Microprocessor 44 determines if the rise is large enough to signify activation of the vehicle ignition. Such a determination is necessary because other occurrences, such as switching off a vehicle's headlights or deactivation of the alternator may cause a voltage rise in the vehicle's electrical system. Deactivation of the vehicle engine is the primary criteria for determining the end of a trip. If the vehicle ignition has been deactivated, control passes to step 150. Otherwise, control passes to step 162.

Step 162 determines whether the vehicle has moved during a predetermined previous amount of time. In a preferred embodiment, this predetermined time is ten minutes, and microprocessor 44 makes its determination by checking a flag variable stored in onboard RAM 99. Other embodiments have a longer predetermined time. For example, the predetermined time could be set to two hours. This would effectively eliminate lack of motion as a criteria for the end of a trip.

Figure 10:
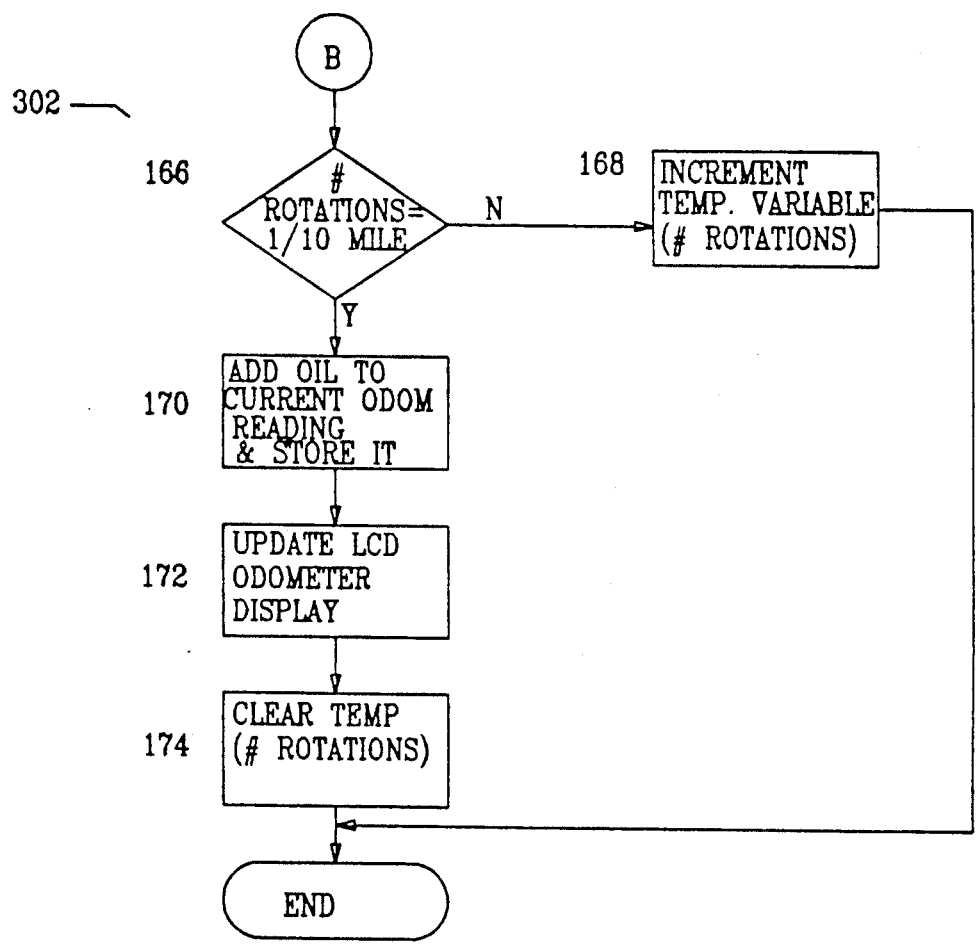
FIG. 10 is a flowchart of a portion of the process of FIG. 9.

If the vehicle has moved within the predetermined time, microprocessor 44 tests whether a distance travelled pulse from the pulse detector 46 is present in step 163. In a preferred embodiment, the software embodying step 163 implements a variable frequency low pass filter to avoid miscounting distance travelled pulses when the vehicle is moving at low speeds. If a distance travelled pulse is not detected, control returns to step 162. Otherwise, current odometer reading field 112 in the onboard RAM 99 is incremented in step 164 and control returns to step 162. If the test of step 162 determines that the vehicle has not moved for the predetermined amount of time, the algorithm is complete, and control returns to step 150, unless data entered from keyboard 56 indicates an alternate action to be performed by microprocessor 44. FIG. 10 is an expanded flowchart of step 164 of FIG. 9. Onboard RAM 99 stores a temporary variable representing the number of rotations of vehicle driveshaft 42 since the last increment of the current odometer reading field 112 (step 164 of FIG. 9). If the number of rotations since the last increment does not indicate that the vehicle has travelled 1/10 mile since the last increment (step 166), the temporary variable is incremented (step 168) and control returns to step 161 of FIG. 9. If the number of rotations of vehicle driveshaft 42 since the last increment is greater than or equal to 1/10 mile (step 166) then 1/10 mile is added to the current odometer reading field 112 (step 170), liquid crystal display 28 is updated to reflect the new current odometer reading (step 172), the temporary variable stored in memory means 58 is set to "0" (step 174), and control is returned to step 161 of FIG. 9. Step 166 uses a calibration ratio field 114, which contains a value corresponding to a number of rotations of the driveshaft 42 per 1/10 mile, the calculation of which is described in connection with FIG. 11.

Figure 11:
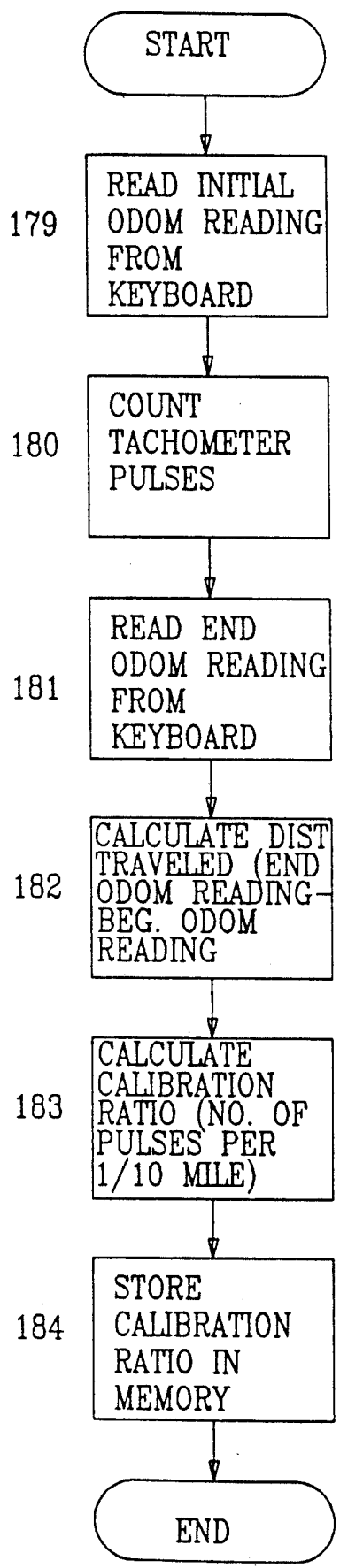
FIG. 11 is a flowchart of a process performed by the microprocessor of FIG. 2 to store a value in the calibration ratio field of FIG. 8.

FIG. 11 is a flowchart of the calibration algorithm performed by microprocessor 44. The algorithm calculates a value for calibration ratio field 114, representing a number of pulses 25 received from driveshaft 42 per 1/10 miles travelled by a particular vehicle in which device 20 is installed. The calibration algorithm of FIG. 11 is performed upon initial powerup of device 20, and thereafter when device 20 is re-initialized or when a calibration ratio needs to be recalculated. The calculated calibration value will differ for different vehicles. Thus, the calibration value must be recalculated whenever device 20 is installed in a new vehicle. To start the software program, a user pushes "MAINT/UTIL" key 208. In step 179, an initial odometer reading is read from keyboards 24 and 26. This is accomplished by entering "ODOM" key 220, followed by an initial odometer reading, using selected ones of keys 212–230, followed by "FUNCT" key 210 and lastly by "ENTER" key 234. After the initial odometer reading is entered, microprocessor 44 counts a number of pulses received on line 85 from pulse detector 46 (step 180) until the user repeats the previous sequence, substituting an end odometer reading for the initial odometer reading step 181. Microprocessor 44 then calculates the distance travelled between the initial odometer reading and the end odometer reading (step 182) according to the following formula:

$$M = I - E$$

where M is the miles travelled, I is the initial odometer reading, and E is the end odometer reading.

Microprocessor 44 then calculates a calibration ratio (step 183) according to the following formula:

$$CR = P/(M \times 10),$$

where CR is the calibration ratio, P is the counted pulses, and M is the miles travelled. The calculated calibration ratio is then stored in calibration ratio field 114 of onboard RAM 99 of microprocessor 44 (step 184).

Figure 12:
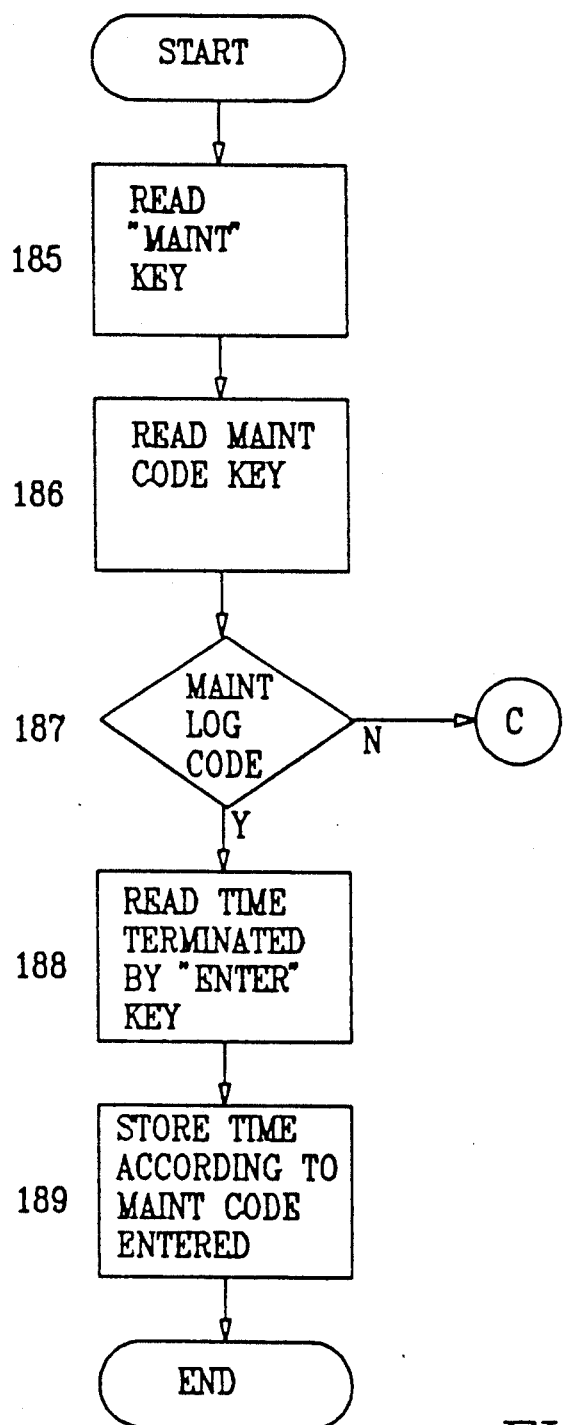
FIG. 12 is a flowchart of a process performed by the microprocessor of FIG. 2 to store maintenance data.

FIG. 12 is a flowchart of an algorithm performed by microprocessor 44 in a maintenance log mode. This mode allows the user to log, in memory 58, the date when a particular maintenance task was performed. For example, in a present preferred embodiment, a user can log the time of a tire change, refuel of the vehicle, oil change, lube job, tuneup, or checkup. To enter maintenance log mode, the user presses "MAINT/UTIL" key 208 on the keypad 24. Microprocessor 44 reads the key press (step 185) and then reads a maintenance key code from keyboard 26, i.e., one of keys 212 and 222-230 (step 186). If the key is one of keys 212 or 222-230 (step 187), microprocessor 44 enters maintenance log mode, in which it reads a time, which in a preferred embodiment includes a date and a time and which is terminated by the enter key, from keyboard 26 (step 188). Next, microprocessor 44 stores a maintenance record containing the time, maintenance code, and current odometer reading (from current odometer reading field 112 of on-board RAM 99) in memory 58 in a format similar to that of trip record 100 (step 189). In a preferred embodiment, trip records and maintenance log records are intermixed in memory 58.

FIG. 13 is a list of maintenance codes that can be entered in step 186. Maintenance codes corresponding to keys 212 and 222-230 have been discussed in reference to FIG. 12. Maintenance codes corresponding to keys 213-221 are discussed below.

Figure 14:
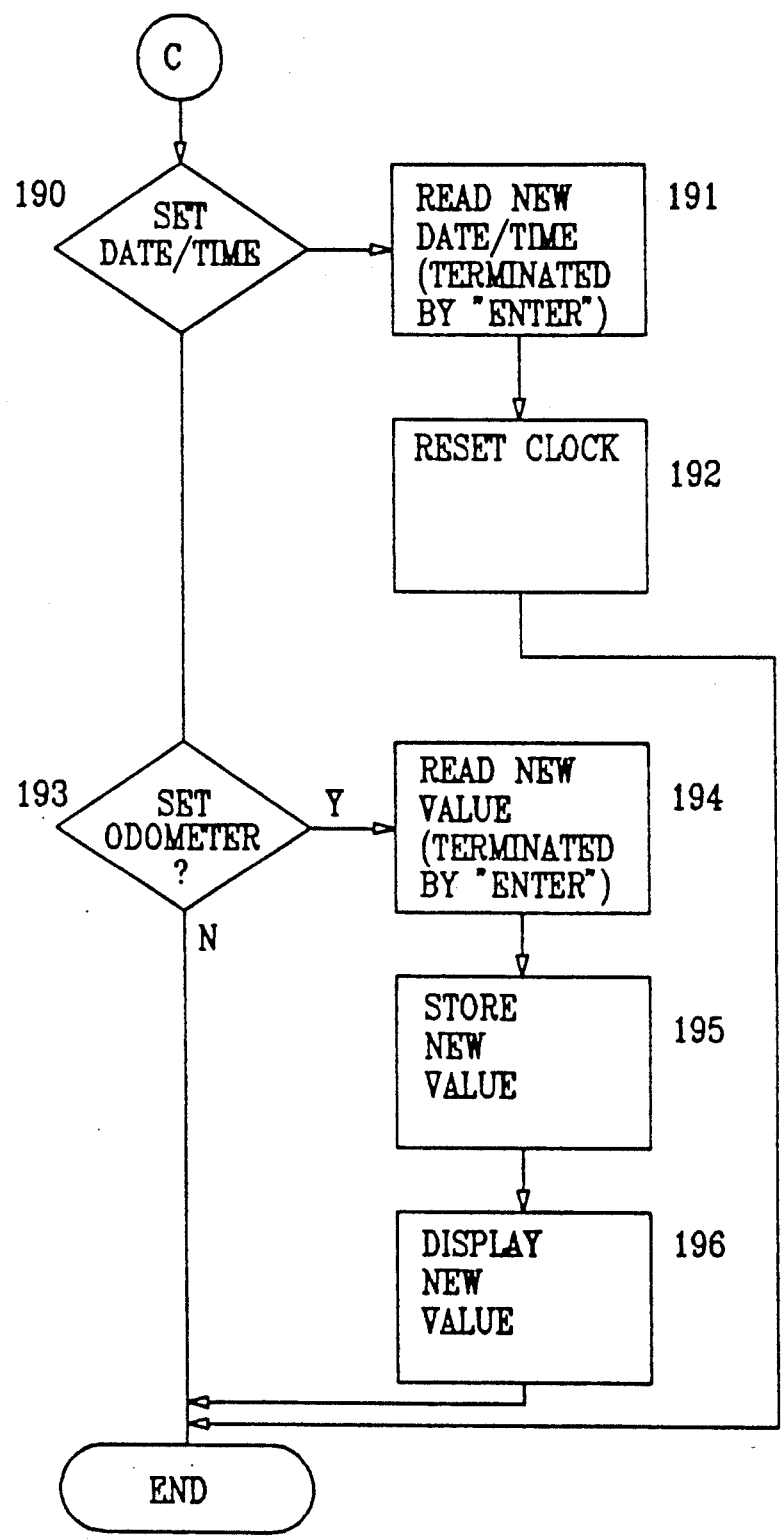
FIG. 14 is flowchart of further portions of the process of FIG. 12.

FIG. 14 is a flowchart of an algorithm performed by microprocessor 44 when the user does not enter maintenance log mode in step 187 of FIG. 12.

If the user wishes to set the date or time ("DATE" key 218 or "TIME" key 217), a new date or time value is read (terminated by "ENTER" key 234) and internal clock 130 is set to the entered value (step 192). In some embodiments, microprocessor 44 will have to reformat the entered value to a format accepted by internal clock 130.

If the user wishes to set the current odometer reading ("ODOM" key 220), a new odometer value is read (terminated by "ENTER" key 234), and the current odometer field 112 of internal memory 99 is set to the entered value (step 195). In some embodiments, microprocessor 44 will have to reformat the entered value to the forma of field 112. Next, microprocessor 44 displays the entered value on LCD 28. Again, the entered value may require reformatting.

Figure 15:
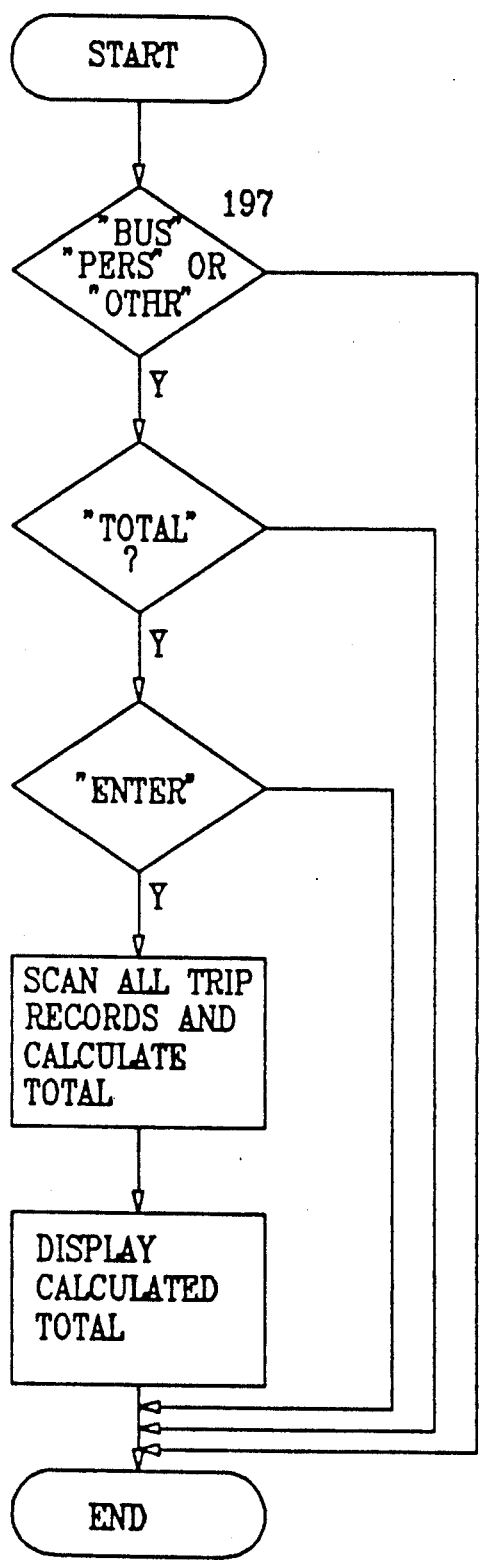
FIG. 15 is a flowchart of a process performed by the microprocessor of FIG. 2 to display total mileage in one of several categories.

FIG. 15 is a flowchart of an algorithm performed by microprocessor 44 when the user wishes to display the total amount of time entered in one of the three categories "BUS", "PERS", and "OTHR" for all the records currently stored in memory 58.

First, microprocessor 44 determines whether the user has pressed one of "BUS" 200 "PERS" 202, or "OTHR" 204 keys (step 197). The key pressed in step 197 indicates the category for which the user wishes to display a total. Then microprocessor determines whether the user has pressed "TOTAL" key 214 (step 198) followed by "ENTER" key 234 (step 199). Next, microprocessor 44 scans all the trip records currently stored in memory 58 and calculates a running total for those trip records having a trip code field 104 corresponding to the key pressed in step 198 (step 200). The calculated total is then displayed (step 201). In alternate embodiments, microprocessor 44 could maintain a running total variable for each of the categories "BUS", "PERS", and "OTHR" in memory 58 and update the running total variables each time a trip record is written to memory 58.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A device for collecting usage data for a motor vehicle having an ignition system activated for starting and deactivated for stopping the engine of the vehicle, the device comprising:
    means for generating a distance travelled pulse for each incremental distance of travel;
    means for generating a clock signal;
    ignition detection means responsive to the activation of the ignition system for generating a vehicle on signal and responsive to the deactivation of the ignition system for generating a vehicle off signal;
    memory means for storing trip record data including an initial odometer reading and a trip start time and for storing a current odometer reading;
    processor means connected to the memory means, the processor means including:
        means for generating a trip start time from the clock signal upon receipt of the vehicle on signal,
        means for determining an initial odometer reading from the current odometer reading upon receipt of the vehicle on signal,
        means for updating the current odometer reading, in accordance with a number of the distance travelled pulses received after receipt of the vehicle on signal, and
        means for storing in the memory means the trip record data including the initial odometer reading and the trip start time,
    means for directly connecting the device to an external microcomputer, and
    means for downloading the stored trip record data to the external microcomputer.

2. The device of claim 1 further comprising:
    first user-actuated input means responsive to the vehicle on signal for selecting one of a plurality of vehicle usage categories upon receipt of the vehicle on signal, and for generating a first usage signal corresponding to the selected vehicle usage category, the first usage signal being supplied to the processor means; and
    second user-actuated input means for selecting one of a plurality of vehicle usage sub-categories associated with the selected vehicle usage category, and for generating a second usage signal corresponding to the selected sub-category, the second usage signal being supplied to the processor means, and
    wherein the processor means includes means for, upon receipt of the first usage signal, storing a one of the plurality of vehicle usage category values corresponding to the first usage signal in the memory means as a part of the trip record data and means for, upon receipt of the second usage signal, storing a one of the plurality of usage sub-category values corresponding to the second usage signal in the memory means as a part of the trip record data.

3. The device of claim 1 wherein the vehicle includes a rotating driveshaft and wherein the means for generating a distance travelled pulse includes:
    a coil adjacent to the driveshaft;
    a plurality of magnets attached to the driveshaft for inducing a varying voltage in the coil; and
    circuitry means attached to the coil for converting the varying voltage in the coil to the distance travelled pulses.

4. The device of claim 1 wherein the ignition system is connected to the vehicle s electrical system, wherein the activation of the ignition system causes a drop in a voltage of the vehicle's electrical system, and wherein the ignition detection means includes means for detecting the drop in the electrical system voltage.

5. The device of claim 4 wherein the circuitry means, responsive to the activation of the ignition system, generates a vehicle on signal.

6. The device of claim 1 wherein the ignition system is connected to the vehicle's electrical system, wherein the deactivation of the ignition system causes a rise in a voltage of the vehicle's electrical system, and wherein the ignition detection means includes means for detecting the rise in the electrical system voltage.

7. The device of claim 6 wherein the circuitry means, responsive to the deactivation of the ignition system, generates a vehicle off signal.

8. The device of claim 1 wherein the memory means includes a random access memory.

9. The device of claim 8 wherein the memory means further includes a random access memory internal to the processor means.

10. The device of claim 1 wherein the means for downloading includes a serial port connected to the processor means.

11. The device of claim 10 wherein the external microcomputer is connected to the device by the serial port and wherein the means for downloading further includes software means for responding to a download command received from the external microcomputer through the serial port.

12. The device of claim 1 wherein the processor means includes an internal clock and wherein the means for generating a trip start time accesses the internal clock.

13. The device of claim 9 wherein the current odometer reading is stored in the internal random access memory.

14. The device of claim 1 wherein a calibration value is stored in the memory means and wherein the means for updating the current odometer reading uses the stored calibration value.

15. The device of claim 1 wherein the device includes a permanent portion attached to a predetermined vehicle and a removable portion capable of being attached to a one of a plurality of vehicles including the predetermined vehicle,
wherein the permanent portion includes identification means for generating a vehicle identification signal corresponding to the predetermined vehicle, and
wherein the removable portion includes recognition means responsive to the vehicle identification signal for determining whether the removable portion is attached to the predetermined vehicle, and notification means for audibly indicating when the removable portion is not attached to the predetermined vehicle.

16. The device of claim 1 wherein the memory means includes a means for storing maintenance record data, wherein the device includes a keyboard for generating keystroke data in response to keystrokes made by a user, wherein the processor means further includes means for generating maintenance record data according to the keystroke data and means for storing in the memory means the generated maintenance record data, and wherein the device includes means for downloading the stored maintenance records to the external microcomputer.

17. The device of claim 1 further including a vertical control panel.

18. A method for collecting usage data for a motor vehicle having an ignition system activated for starting deactivated for stopping the engine of the vehicle, the method comprising the steps of:
generating a distance travelled pulse for each incremental distance of travel;
generating a clock signal;
generating a vehicle on signal responsive to the activation of the ignition system;
generating a vehicle off signal responsive to the deactivation of the ignition system;
storing trip record data including an initial odometer reading and a trip start time in a memory;
generating a trip start time from the clock signal upon receipt of the vehicle on signal;
determining an initial odometer reading from the current odometer reading upon receipt of the vehicle on signal;
updating the current odometer reading in accordance with a number of the distance travelled pulses received upon receipt of the vehicle on signal and receipt of the vehicle off signal;
connecting the device directly to an external microcomputer; and downloading the stored trip record data to the external microcomputer.

19. The device of claim 1 further including:
means, connected to the ignition detection means, for determining in accordance with the vehicle off signal whether the ignition system is deactivated;
means, connected to the determining means, for halting the means for updating the current odometer reading when the ignition system is deactivated.

20. The device of claim 19 further including:
means, connected to the determining means, the clock generating means, and to the pulse generating means, for deciding whether a distance travelled pulse has been generated within a predetermined period of time;
means, connected to the deciding means, for halting the means for updating the current odometer reading when no distance travelled pulse has been generated within the predetermined period of time.

21. The device of claim 1, including a data entry means for allowing a user to enter data into the device, wherein the data entry means is formed in a unitary manner with the device.

* * * * *